United States Patent [19]

Berry et al.

[11] 3,946,405

[45] Mar. 23, 1976

[54] INK JET MASK

[75] Inventors: James M. Berry, Deerfield; Anthony J. Hauser, Stone Park; Carl D. Swanson, Arlington Heights, all of Ill.

[73] Assignee: Teletype Corporation, Skokie, Ill.

[22] Filed: Oct. 29, 1974

[21] Appl. No.: 518,699

[52] U.S. Cl. .......... 346/140 R; 346/75
[51] Int. Cl.² .......... G01D 15/18
[58] Field of Search .......... 346/75, 140

[56] References Cited

UNITED STATES PATENTS

| | | | |
|---|---|---|---|
| 1,817,098 | 3/1929 | Ranger | 346/75 X |
| 3,570,275 | 3/1971 | Weber et al. | 346/75 X |
| 3,611,422 | 10/1971 | Rourke | 346/75 |
| 3,813,675 | 5/1974 | Steffy et al. | 346/75 |
| 3,826,192 | 7/1974 | Kattner et al. | 346/75 X |

*Primary Examiner*—Joseph W. Hartary
*Attorney, Agent, or Firm*—W. G. Dosse; J. L. Landis

[57] ABSTRACT

A two piece mask for an ink jet printer in which the knife edge for intercepting waste ink comprises part of a structure for supporting a meniscus of ink that drains drops of ink from the knife edge and allows the ink to flow away from the region of the knife edge through a suitable flow path while separating waste ink from the record medium of the printer.

8 Claims, 3 Drawing Figures

INK JET MASK

FIELD OF THE INVENTION

The present invention relates to ink jet printers and more particularly to a mask to block and carry away waste ink.

BACKGROUND OF THE INVENTION

Ink jet printers are well known in the prior art and one characteristic example is shown in U.S. Pat. No. 3,769,624 granted on Oct. 30, 1973, to Lee et al. In such ink jet printers drops of ink are formed from a stream of ink flowing from a nozzle. The normal flow path of the ink impinges on a mask. However, any ink drops that are to be printed on the paper are charged and deflected out of the original or normal path into a second path which impinges upon an appropriate place on the paper. Uncharged ink continues on the original or normal path which is substantially the axis of the nozzle and strikes the mask or catcher and proceeds from the mask to a waste container or is recycled through the nozzle.

Problems have arisen with common catchers or masks in that many masks are substantially a planar surface at right angles to the path of ink. This results in a high impact of the drops of ink on the mask, causing the drops to spatter or produce a mist which can interfere with the operation of the printer and contaminate the entire machine. Additionally, the drops of ink that strike the mask must be readily conducted away.

The knife edge of the mask is the decision line between those drops caught by the mask and those drops which are sufficiently deflected so as successfully to avoid the mask and strike the paper. A partially deflected drop that strikes the knife edge head-on, as will occasionally happen in an ink jet printer, can leave a build-up or a blob of ink on top of the knife edge. A blob on the knife edge will raise the effective height and thickness of the knife edge in the region of the blob and thus being to stop drops that should not be stopped.

It is an object of the present invention to assure that drops of ink stopped by an ink jet mask do not remain and buildup on the knife edge of the mask.

It is also an object of the present invention to prevent or minimize spattering of ink that strikes the mask of an ink jet printer.

It is still another object of the present invention to conduct waste ink away from the knife edge of an ink jet mask in an ink jet printer simply, reliably and inexpensively.

Yet another object of the present invention is keep an ink-jet printer mask clean.

SUMMARY OF THE INVENTION

With the foregoing and other objects in view, a two-piece mask in accordance with certain features of the invention is used for catching a generally horizontal stream of liquid, such as a stream of ink drops as used in an ink-jet printer. The mask includes (a) a first mask member having an inner wall, an outer wall, and an upper end; and (b) a second mask member having an inner wall, an outer wall against which the liquid stream impinges, and an upper end. The two mask members are mounted together so that a generally vertical, capillary, liquid-receiving space is defined between portions of the inner walls of the two members adjacent to the upper ends. A body of the liquid is suspended in the space by surface tension and has a concave meniscus at the top bridging the upper ends of the two members. The mask further includes means for permitting flow of liquid downward, out of the space, whenever liquid is added to the top of the meniscus.

BRIEF DESCRIPTION OF THE DRAWINGS

The present invention will be more readily understood when considered in conjunction with the accompanying drawings wherein:

A blade 26, preferably about 0.1 millimeters thick, is welded to the face of the shield 20 on the side thereof that faces the nozzle 10. The blade 26 has a knife edge 28 that is no lower than the top edge 22 yet somewhat below the path 14. Therefore, the knife edge 28 is positioned above the path 12 such that undeflected ink, that is, ink not intended to reach the paper, impinges on the blade 26 somewhere below the knife edge 28. Preferably, the top edge 22 is also slightly above the path 12 to assure that ink flowing along the path 12 will not pass through an opening or aperture 30 formed through the blade 26 and strike the paper 16. As illustrated in FIg. 1, the aperture 30 is formed across the length of the blade, from right to left as viewed from the nozzle 10, on both sides of the ink path 12 and is bounded by bent metal portions 27-27 of the blade 26 formed at both ends to mount the blade 26 to the shield 20. The aperture 30 is located below the point at which waste ink traveling along path 12 impinges on the outer surface of the blade, meaning the right-hand surface as viewed in FIG. 2. The aperture 30 extends perhaps 0.1 or 0.2 millimeters from the shield 20, from left to right as viewed in FIG. 2, and preferably 4.5 millimeters wide in blade 26 from left to right as viewed from nozzle 16 in FIG. 1.

Figure 1:
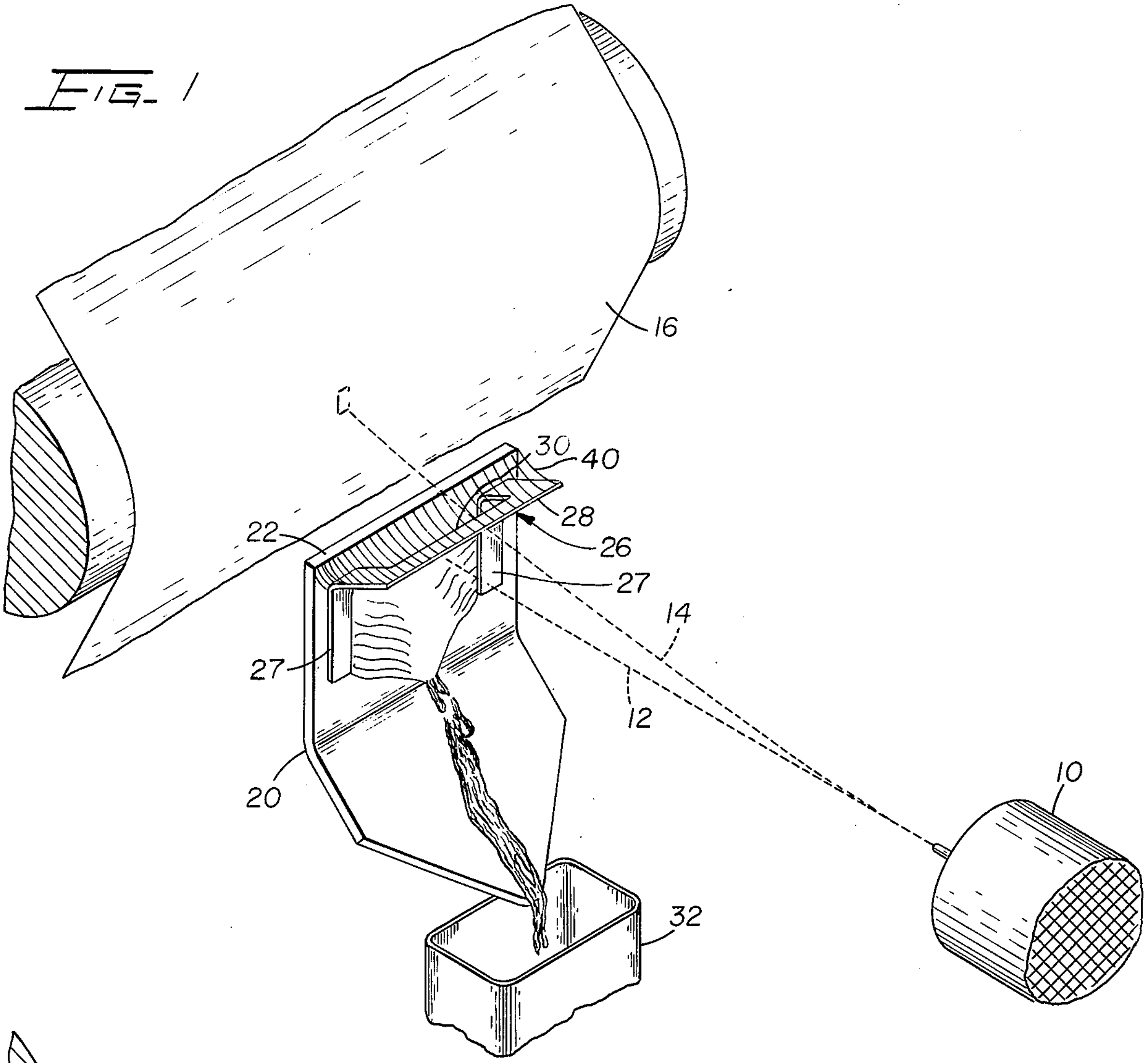
FIG. 1 is a perspective, schematic drawing of an ink jet printer illustrating a mask according to the present invention.

Ink flowing along the path 12 that strikes the underside of the blade 26, deflects to the shield 20 and ultimately flows down the face of the shield 20 into a trough 32 where it is collected and either discarded or recycled in accordance with techniques known to the prior art.

It is well known that liquid, if it wets an adjacent surface, such as the inner or right-hand surface of the shield 20 above the aperture 30 will form a surface tension meniscus to that surface. If a second wetted surface, such as the inner or left-hand surface of the blade 26 is close enough to the first wetted surface, for example a distance of approximately 0.7 millimeters between the top edge 22 and the knife edge 28, the liquid will form a body 40 of the liquid (FIG. 2) having a surface meniscus extending to both surfaces. The liquid will then hang almost catenary-like from the two rigid surfaces. If more liquid is added to the top of the meniscus, some liquid will then begin draining from the bottom of the body of liquid though the aperture 30. As surplus ink drains from the bottom of the body of liquid ink, it flushes the mask shield and keeps it clean and free of contaminants and dried or concentrated ink.

Figure 2:
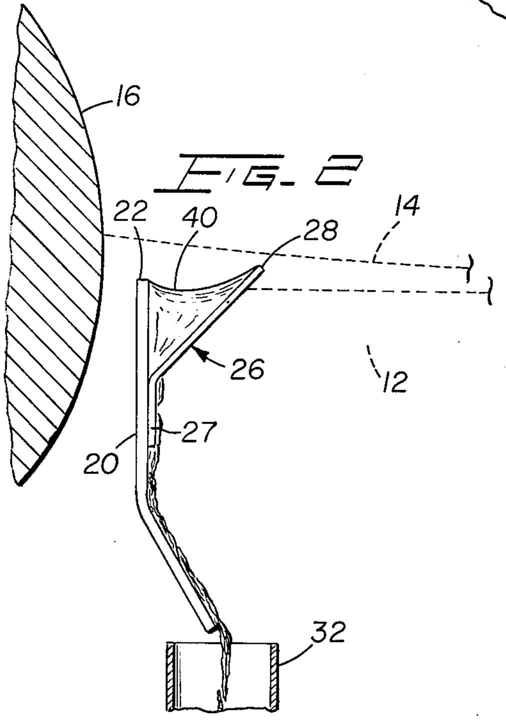
FIG. 2 is a side view detail of the mask of FIG. 1.

Therefore, a quantity 40 of liquid can be suspended by its surface tension in the generally V-shaped space or pocket formed between the closely spaced facing inner walls of the shield 20 and the blade 26 above the aperture 30, as illustrated in FIG. 2. The material of the liquid, the shield 20, and the blade 26 are chosen such that the liquid will readily wet them, particularly the blade 26.

Referring further to FIG. 2, when the printer is first turned ON, ink begins to flow from the nozzle 10 and impinges upon the blade 26 above the aperture 30, as illustrated in FIG. 2. Due to surface tension, this ink adheres to the tiny blade and shield and builds up the body of liquid ink 40 that is suspended between the top edge 22 of the shield 20 and the knife edge 28 of the blade 26. In the case of a printer that has been OFF long enough for ink to have dried on the blade 26 and the shield 20, the dried ink actually aids in ink flow and thus promotes wetting by the newly flowing ink. Additionally, the new ink redissolves the old, dried ink and thus prevents build-up of dried ink on the mask from repeated shut-downs of the printer. As above, this redissolved ink is then flushed from the mask by drainage from the body of liquid ink, thereby cleaning the mask. As more ink impinges on the blade 26, the surface tension of the liquid 40 can no longer support all the weight and ink begins to flow down from the body 40 of liquid through the aperture or opening 30 and into the trough 32. The fact that the body 40 of liquid extends all the way up to the wetted knife edge 28 prevents drops of ink from remaining on the knife edge 28. The ink immediately flows down the knife edge on top and bottom thereof and forms a part of the body 40.

In order to prevent spatter of ink striking the blade 26, the blade 26 is extended at an angle from the shield 20 and also at an angle to the path 12 which intersects the blade 26. It has been found, experimentally, that spatter and misting is somewhat reduced when the angle between the blade 26 and the path 12 decreases from 90° to 60°. Any angle down to as low as 0° will provide some reduction in the amount of spatter. Problems arise in flowing the ink from the top of the knife edge 28 with very small angles near zero. Therefore, 30 to 45 degrees has been found to be a very convenient, approximate angle between the blade 26 and the path 12.

Figure 3:
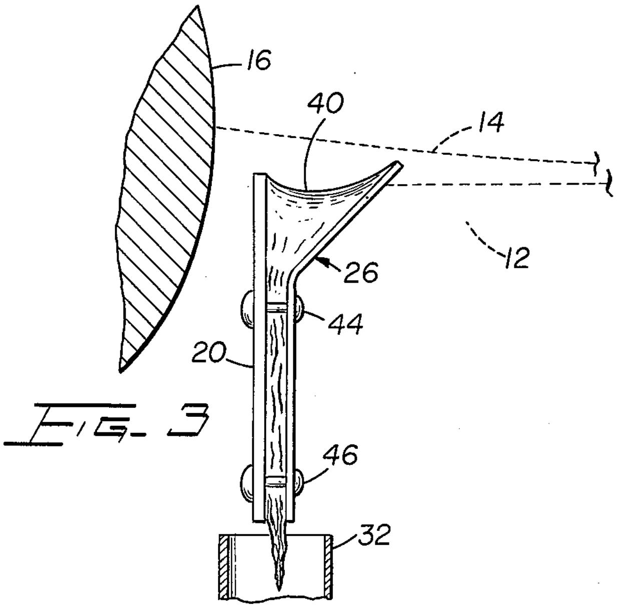
FIG. 3 is an alternative form of the mask of FIG. 2 and with a capillary path between the blade and the shield. DETAILED DESCRIPTION Referring now to the drawings and more particularly to FIG. 1, an ink jet nozzle or gun assembly 10 emits ink along a path 12 which is substantially coaxial with the nozzle 10. If any drops of the stream of ink flowing along the path 12 are to be printed, they are electrostatically deflected in accordance with known prior-art techniques to assume a path 14 and proceed to impinge upon the surface of a record medium or paper 16. A shield 20 is mounted in front of the paper 16 and comprises a solid piece of metal having a top edge 22 positioned below the path 14. The shield 20 is positioned somewhere along the length of the paths 12 and 14 between the nozzle 10 and the paper 16 and is preferably positioned as close as possible to the paper 16.

Referring now to FIG. 3, an alternate embodiment is shown of the mask of FIGS. 1 and 2 in which the blade 26 is not welded or bonded directly to the shield 20 but is displaced slightly therefrom perhaps by rivets 44 and 46 having enlarged central bodies to act as spacers as well as fasteners. Rather than provide an opening 30, the space between the blade 26 and the shield 20 is chosen such that a capillary phenomenon is experienced. The body 40 of liquid is captured and held much as in the embodiment of FIG. 2. Additional liquid ink added to the body 40 causes ink to drain through the capillary space between the blade 26 and the shield 20 and fall into the trough 32.

By employing a body of liquid 40 suspended by surface tension from the knife edge 28, build-up of ink on the knife edge 28 can effectively be prevented and certainly minimized, thereby maintaining an accurate level of the knife edge 28 for separating the ink in the two paths 12 and 14, capturing the former and not the latter.

Although only one specific embodiment of the invention is shown in the drawings, and described in the foregoing specification, it will be understood that invention is not limited to the specific embodiment described, but is capable of modification and rearrangement and substitution of parts and elements without departing from the spirit of the invention.

We claim:

1. A two-piece mask for catching a generally horizontal stream of liquid, comprising:

a. a first mask member having an inner wall, an outer wall, and an upper end;
b. a second mask member having an inner wall, an outer wall against which the liquid stream impinges, and an upper end;
c. means for mounting the two members together so that a generally vertical, capillary, liquid-receiving space is defined between portions of the inner walls of the two members adjacent to the upper ends;
d. a body of liquid suspended in the space by surface tension and having a concave meniscus at the top bridging the upper ends of the two members; and
e. means for permitting flow of liquid downward, out of the space whenever liquid is added to the top of the meniscus.

2. A mask as recited in claim 1, wherein the second mask member is formed with an aperture therethrough below the point of liquid impingement against the outer wall of the second member and communicating with the liquid-receiving space so that liquid can flow from the outer surface of the second mask member through the aperture and into the space.

3. A mask as recited in claim 1, wherein:

the first mask member comprises a generally vertical shield of solid imperforate material; and
the second mask member comprises a blade mounted to the shield projecting therefrom at an angle to the stream of liquid.

4. A mask as recited in claim 3, wherein the angle between the blade and the stream is between approximately 30° and 45°.

5. A mask as recited in claim 3, wherein the blade is formed with an aperture therethrough below the point of liquid impingement and communicating with the liquid receiving space.

6. A mask as recited in claim 3, wherein the means for permitting flow of liquid downward (clause *e*, claim 1), includes a capillary space defined between downwardly projecting, spaced parallel portions of the shield and blade.

7. A two-piece mask for catching waste ink in an ink-jet recording apparatus of the type wherein a stream of ink is selectively projected along a first, generally horizontal path arranged to clear the mask for impingement on a record medium, or along a second, generally horizontal path arranged to intersect the mask, which mask comprises:

a solid, generally vertical shield having an inner wall, an outer wall and an upper edge positioned near but not intersecting the first path; and a blade having an inner wall, an outer wall and an upper edge, the blade being mounted to the shield at an angle to the second path so that ink traveling along the second path, but not along the first path, is intercepted by the blade below the upper edge and runs downward along the outer surface of the blade toward the shield;

the inner surfaces of the blade and shield being spaced so that a body of ink is suspended in the space by surface tension, which body of ink is formed with a concave meniscus at the top directed toward the first path and extending between the upper edges of the shield and the blade.

8. A mask as recited in claim 7, wherein:

a. a portion of the blade is spaced from the inner wall of the shield, so as to define an aperture in the shield through which ink can flow from the outer surface of the blade into the space between the shield and blade; and so that ink can flow downward from the body out of the space, whenever ink is added to the top of the meniscus; and b. the shield is positioned with its outer surface near the record medium, with the blade mounted on the side of the shield opposite to the record medium, so that ink impinging on the blade is separated from the record medium by the material of the shield.

* * * * *